Figure 1:
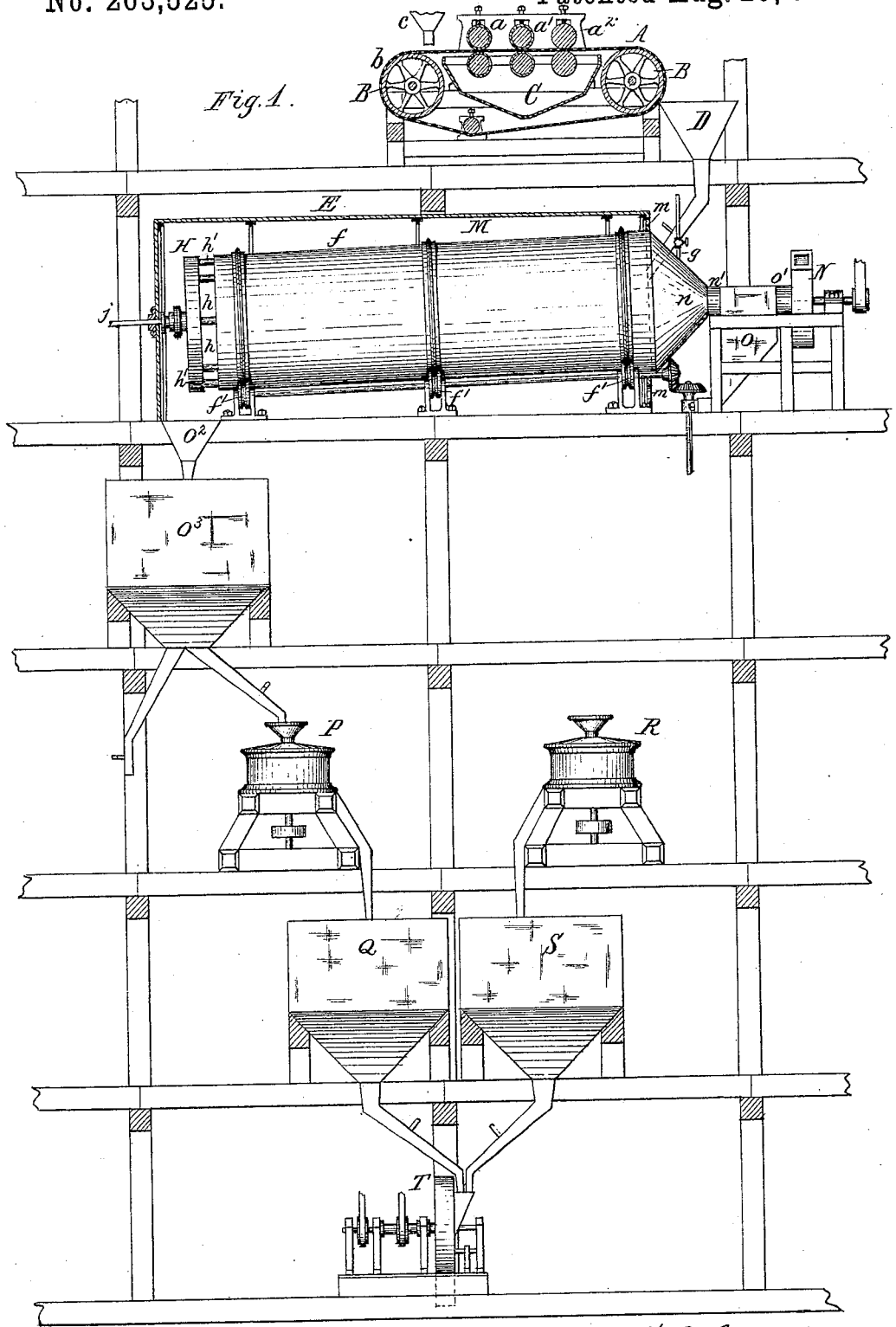

(No Model.) 2 Sheets—Sheet 1.

W. T. JEBB.
PROCESS OF AND APPARATUS FOR TREATING THE REFUSE OF STARCH, &c.

No. 263,525. Patented Aug. 29, 1882.

Witnesses: Chas. J. Buchheit. Edw. J. Brady.

W. T. Jebb, Inventor.
By Wilhelm & Bonner, Attorneys.

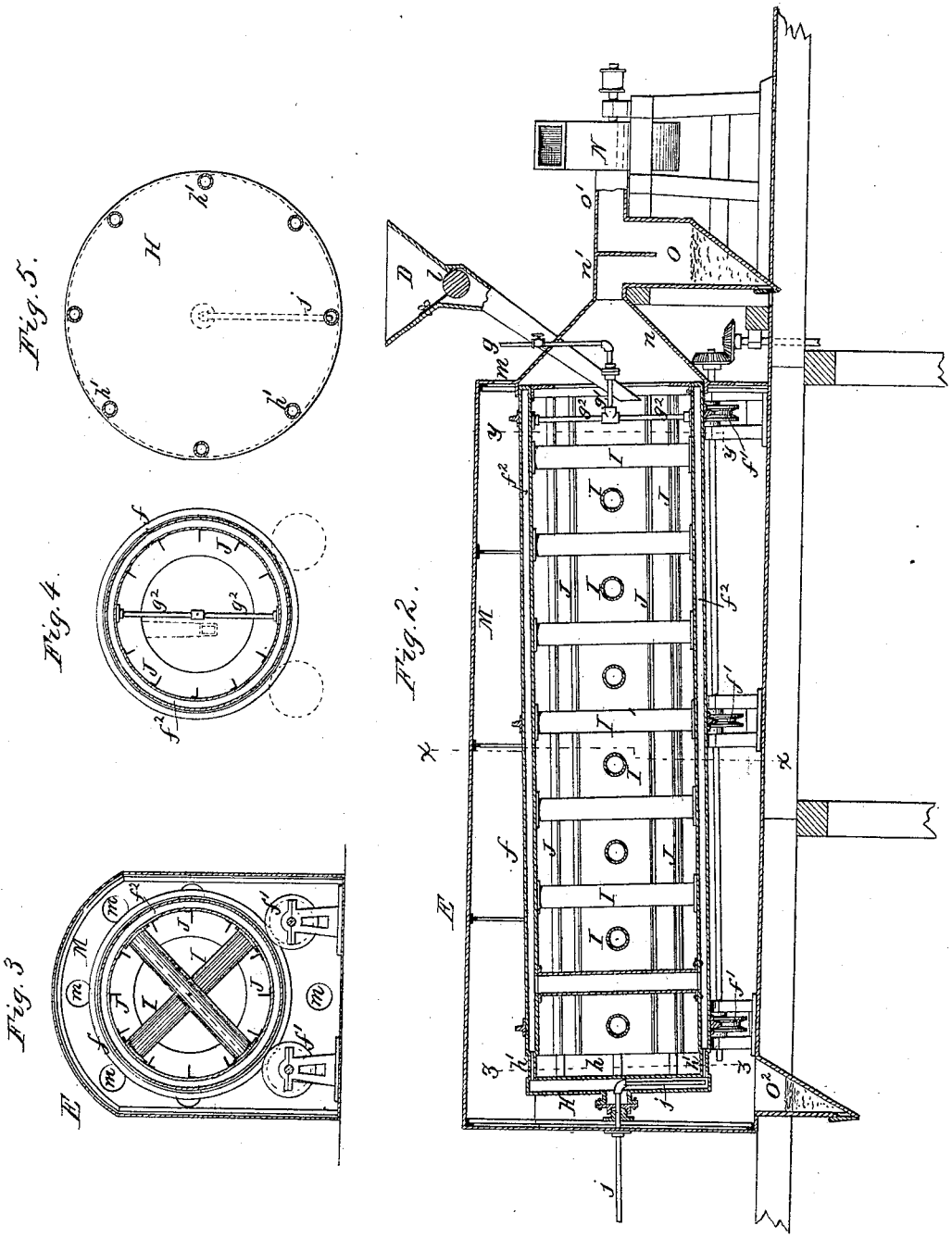

UNITED STATES PATENT OFFICE.

WILLIAM T. JEBB, OF BUFFALO, NEW YORK.

PROCESS OF AND APPARATUS FOR TREATING THE REFUSE OF STARCH, &c.

SPECIFICATION forming part of Letters Patent No. 263,525, dated August 29, 1882.

Application filed July 12, 1882. (No model.)

*To all whom it may concern:*

Be it known that I, WILLIAM T. JEBB, of the city of Buffalo, in the county of Erie and State of New York, have invented new and useful Improvements in Process of and Apparatus for Treating the Refuse of Starch and other Substances, of which the following is a specification.

This invention relates to the treatment of the wet refuse or offal which results from the operation of extracting starch from Indian corn or other grain by the wet process.

In treating grain for the purpose of extracting those of its constituent parts which are useful for manufacturing starch, grape-sugar, glucose, spirits, and the like, the grain is first softened by steeping and then ground with water. The ground material is then passed over suitable sieves to separate the bran, hulls, skins, and other coarse parts from the crude starch. This coarse offal, consisting principally of fragments of the covering and outer layers of the kernels of grain, ferments rapidly in warm weather, and becomes thereby unfit for use as food for animals.

The object of this invention is to thoroughly remove the moisture from the offal, thereby preserving it in a condition in which it can be stored for a considerable length of time or be shipped to distant markets without deteriorating, and also to improve the appearance and the nutritive value of the offal.

My invention consists, to that end, in the hereinafter-described process of preparing this offal for food for animals, which consists principally in first separating the bulk of the moisture from the solid portions of the offal by pressure, then removing the remaining moisture by heat, and then regrinding the offal, whereby a uniform product of even grain and appearance is produced; also, in intimately mixing the reground offal with ground grain, whereby the product is rendered more nutritious and palatable to the animals; also, in the peculiar construction of the drying apparatus, as will be hereinafter fully set forth.

In the accompanying drawings, consisting of two sheets, Figure 1 is a partly-sectional elevation, showing a train of machinery which may be employed in carrying out my improved process. Fig. 2 is a horizontal vertical section of the drier. Figs. 3 and 4 are cross-sections thereof in lines $x\ x$ and $y\ y$, Fig. 2, respectively. Fig. 5 is a cross-section in line $z\ z$, on an enlarged scale.

Like letters of reference refer to like parts in the several figures.

A represents a machine whereby the moisture is separated from the offal by pressure. A squeezing-machine of any ordinary and well-known construction or any suitable hydraulic or other press may be employed for this purpose.

The squeezing-machine represented in the drawings is provided with three pairs of horizontal rollers, $a\ a'\ a^2$, between which passes an endless apron, $b$, which is constructed of wire-cloth or other perforated or reticulated material, and which runs over pulleys B. Motion is imparted to the pulleys B and rollers $a\ a'\ a^2$ by suitable gear-wheels. The wet offal is delivered upon the apron $b$ in front of the rollers $a\ a'\ a^2$ by a spout, $c$. The movement of the apron carries the offal successively between the pairs of rollers $a\ a'\ a^2$, by which the bulk of the moisture is pressed out of the offal. The moisture is collected in a receptacle, C, underneath the rollers, and the offal is discharged from the tail of the endless apron into a hopper or receptacle, D. The first and second pairs of rollers, $a\ a'$, are preferably covered with india-rubber or other yielding or elastic material, and the third pair of rollers, $a^2$, are preferably constructed of rigid material—for instance, chilled cast-iron.

E represents the drying apparatus in which the remaining moisture is removed from the offal by heat. Any suitable drier may be used for this purpose; but I prefer to employ a drier of the construction shown in the drawings. This drier is provided with a rotating cylindrical steam-jacket, $f$, through which the grain passes, and which rests upon rollers $f'$, one or more of which are turned by gear-wheels, whereby the proper rotative movement is imparted to the cylindrical jacket $f$.

$g$ represents the steam-supply pipe whereby steam is conducted to the drier. This pipe is stationary and connects by means of a steam-tight stuffing-box with a rotating pipe, $g'$, secured to the upper or head end of the cylinder $f$. The latter is sufficiently inclined from end to end to cause the material to travel through it with the proper velocity.

The pipe $g'$ is provided with two or more branches, $g^2$, which conduct the steam into the space $f^2$ between the double walls of the steam-jacket $f$.

The tail end of the cylinder $f$ is provided with a hollow head, H, whose interior communicates with the steam-space $f^2$ between the double walls of the cylinder $f$.

The head H is arranged at a suitable distance from the rear end of the cylinder $f$, so as to leave openings $h$ between the cylinder $f$ and the head H of sufficient size to insure the full discharge of the dried material from and the free ingress of air to the interior of the cylinder $f$. The head H is connected with the steam-space of the jacket $f$ by short tubes $h'$.

I represents steam-pipes arranged diametrically or otherwise in the cylinder $f$ in such manner as to extend through the open interior space of the cylinder and communicate with the steam-space $f^2$ between the double walls of the cylinder $f$. The pipes I are preferably arranged alternately at right angles to each other, as shown in the drawings. These pipes furnish a very large heating-surface, and increase thereby the efficiency of the drier, and they also operate as stays and render the cylinder $f$ very strong and rigid.

$j$ represents the pipe through which the water resulting from the condensation of steam is discharged from the drier. This pipe is stationary, and depends with its inner end into the head H and reaches nearly to the lowest point of the steam-space of the drier.

The head H is provided with a stuffing-box which turns on the pipe $j$.

For the purpose of repeatedly elevating and dropping the material in passing through the cylinder $f$, the inner surface of the latter is provided with strips or buckets J, arranged lengthwise of the cylinder at proper distances apart, as shown in the drawings, or, if preferred, the inner wall of the cylinder $f$ may be corrugated lengthwise, so that the corrugations operate as buckets to elevate the material.

M represents a casing which incloses the cylinder $f$, and which is provided with inlet-openings $m$ near the head of the cylinder $f$. The opposite end of the casing M is closed to compel the air which enters at $m$ and passes through the space between the cylinder $f$ and the casing M to pass through the opening $h$ into the interior of the cylinder $f$. The air becomes heated by contact with the outer surface of the cylinder before it reaches the opening $h$.

N represents a suction-fan or other suitable device, which is connected with the interior of the cylinder $f$, so as to draw an air-current through the same in a direction opposite to that in which the material to be dried passes through the same.

As shown in the drawings, the higher end of the cylinder $f$ is provided with a hood, $n$, which is stationary and fitted against the end of the cylinder by means of an elastic ring or other suitable means, which forms a practically air-tight joint. The hood $n$ terminates in a tube, $n'$, which connects with a chess-hopper, O, in which the air-current is weakened, thereby permitting the heavy and valuable particles carried off by the air-current to drop out of the current. These particles are collected in the chess-hopper O and automatically discharged from the same from time to time, in a well-known manner, through an opening provided with a flap-valve. The chess-hopper is connected with the eye of the fan by a tube, $o'$.

$O^2$ represents a hopper, which receives the dried material escaping from the openings $h$ at the rear end of the cylinder $f$.

The material to be dried passes in a continuous stream from the hopper D into the upper or head end of the drier-cylinder, the hopper D being provided with a feed-roller, $l$, or some other suitable device, whereby the feed is rendered uniform. The material entering the cylinder $f$ falls upon the heated inner surface of the latter and becomes heated by contact with the same. It is elevated by the buckets or corrugations of the cylinder until said buckets or corrugations assume an inclination, which causes the material to slide off, when it falls through the heated air-current passing through the cylinder $f$, part of the material falling upon and sliding over the tubes I, which continually change their inclination as the cylinder rotates. This operation is repeated a great many times while the material remains in the cylinder and effects a perfect drying of the material. The material is so elevated and permitted to drop until it reaches the rear end of the cylinder $f$, from which it escapes through the openings $h$ into the hopper $O^2$. The cylinder is made of such length and is so inclined that the material will be perfectly dry when it reaches the openings $h$. The corrugations form a large heating-surface, and as both the outer and inner surfaces of the cylinder $f$ are utilized as heating-surfaces, the steam is employed very economically.

The dried offal passes from the receptacle $O^2$ to a suitable receiving-bin, $O^3$, from which it is fed to a grinding, crushing, or disintegrating mill, P, of any suitable and well-known construction, whereby the material is reduced to a uniform degree of fineness, so that no large flakes or scales appear in the same. The bin $O^3$ may be provided with an additional discharge-spout, so that a portion of its contents may be filled directly into bags or barrels, if so desired. The ground offal is collected in a hopper or receptacle, Q, and may be sold in this condition; or it may be mixed with ground Indian corn or other suitable grain as follows:

R represents a grinding, crushing, or disintegrating mill in which Indian corn or any other suitable grain which it is desired to mix with the ground offal is ground to about the same degree of fineness.

S represents a hopper or receptacle which receives the ground grain from the mill R.

T represents a mixing-machine of any suitable construction, which receives both the ground offal and the ground grain from the receivers Q and S, respectively, in the proportion in which it is desired to mix these ingredients, the discharge-spouts of the receivers Q and S being provided with suitable slides or other devices whereby the discharge of the material can be regulated.

Any suitable mixing-machine may be employed for mixing the ingredients; but I prefer to use for this purpose a disintegrating-machine provided with several concentric rows of beaters revolving in opposite directions in an inclosing case which has a feed-opening at or near its center and a discharge-spout at its periphery.

The ground grain and offal are simultaneously delivered into the central feed-opening of the mixing-machine T and become thoroughly mixed while passing through the same, and are finally discharged therefrom as a uniform product and delivered directly into barrels or boxes for shipment, or into suitable storage bins or receptacles. If preferred, the whole grain may be delivered directly into the mill in which the offal is reground and be ground with the same, and in that case the mixing-machine T may be omitted; but I prefer to employ a separate mill for grinding the whole grain and the mixing-machine, as specified.

The addition of the ground whole grain to the ground offal increases the nutritive value of the offal, renders it more palatable to the animals, and at the same time improves its appearance. The feed so produced can be stored for a considerable period of time or be shipped to distant markets in warm or cold weather without fermenting or otherwise deteriorating.

I claim as my invention—

1. The herein-described process of preparing wet grain-offal for use as food for animals, which consists in first separating the bulk of the moisture from the offal by pressure, then removing the remaining moisture by heat, and then regrinding, crushing, or disintegrating the dried offal to a substantially-uniform degree of fineness.

2. The herein-described process of preparing wet grain-offal for use as food for animals, which consists in first separating the bulk of the moisture by pressure, then removing the remaining moisture by heat, and then grinding the dried offal and mixing it with ground grain, substantially as set forth.

3. In an apparatus for preparing wet grain-refuse for use as food for animals, the combination of an apparatus, A, whereby the bulk of the moisture is separated from the offal by pressure, a drier, E, in which the remaining moisture is removed by heat, and a mill, P, in which the dried offal is reground, substantially as set forth.

4. In an apparatus for preparing wet grain-refuse for use as food for animals, the combination of an apparatus, A, whereby the bulk of the moisture is separated from the offal by pressure, a drier, E, in which the remaining moisture is removed by heat, a mill, P, in which the dried offal is reground, and a mixing-machine, T, in which the reground offal is mixed with ground grain, substantially as set forth.

5. In a drier, a rotating hollow cylinder, $f$, constructed with double walls, forming a steam-space, $f^2$, between them, and provided with means whereby the material to be dried is repeatedly elevated and dropped in said cylinder, substantially as set forth.

6. In a drier, a rotating hollow cylinder, $f$, constructed with double walls, forming a steam-space, $f^2$, and transverse steam-pipes I, communicating at their ends with said steam-space, substantially as set forth.

7. The combination of a rotating cylinder, $f$, provided with a steam-space, $f^2$, head H, and openings $h$, formed between the cylinder and the head H, substantially as set forth.

8. The combination of a rotating cylinder, $f$, provided with a steam-space, $f^2$, head H, openings $h$, and discharge-pipe $j$, having its depending end arranged in the head H, substantially as set forth.

9. The combination of a rotating cylinder, $f$, provided with a steam-space, $f^2$, head H, and pipes I, substantially as set forth.

10. The combination, with the cylinder $f$, provided with a steam-space, $f^2$, and openings through which the dried material is discharged, of a casing, M, inclosing the cylinder $f$, and means whereby an air-current is drawn along the outer side of the cylinder and through the interior thereof, substantially as set forth.

WILLIAM T. JEBB.

Witnesses:
JNO. J. BONNER,
EDW. J. BRADY.